United States Patent [19]
Hoshi et al.

[11] 4,353,809
[45] Oct. 12, 1982

[54] PROCESS FOR THE PRODUCTION OF MICROCAPSULES

[75] Inventors: Yoshiyuki Hoshi; Hiroharu Matsukawa, both of Fujinomiya, Japan

[73] Assignee: Fuji Photo Film Co., Ltd., Kanagawa, Japan

[21] Appl. No.: 128,786

[22] Filed: Mar. 10, 1980

[30] Foreign Application Priority Data

Mar. 9, 1979 [JP] Japan ................................. 54/27406
Jan. 22, 1980 [JP] Japan ................................. 55/6087

[51] Int. Cl.$^3$ ........................................... B01J 13/02
[52] U.S. Cl. ................................ 252/316; 428/320.6; 428/320.8; 528/914
[58] Field of Search ........................................ 252/316

[56] References Cited

U.S. PATENT DOCUMENTS 3,897,361  7/1975  Saeki et al. ........................... 252/316
4,001,140  1/1977  Foris et al. ........................... 252/316
4,089,802  5/1978  Foris et al. ........................... 252/316
4,138,362  2/1979  Vassiliades et al. ................. 252/316

Primary Examiner—Richard D. Lovering
Attorney, Agent, or Firm—Sughrue, Mion, Zinn, Macpeak & Seas

[57] ABSTRACT

Microcapsules with a melamine-formaldehyde or urea-formaldehyde resin capsule shell are produced by adding in advance a polyvalent isocyanate, a polyvalent isothiocyanate or a prepolymer thereof to the hydrophobic oily liquid to be encapsulated, emulsifying the hydrophobic oily liquid in an aqueous solution of a water-soluble polymer, adding an aqueous solution of melamine and formaldehyde or a precondensate thereof or urea and formaldehyde to the emulsion, and polymerizing the melamine and formaldehyde or a precondensate thereof or the urea and formaldehyde.

7 Claims, No Drawings

PROCESS FOR THE PRODUCTION OF MICROCAPSULES

BACKGROUND OF THE INVENTION

1. Field of the Invention

This invention relates to a process for production of microcapsules. More particularly it is concerned with a process for production of fine microcapsules in which a polyvalent isocyanate, a polyvalent isothiocyanate or a prepolymer thereof is incorporated into a hydrophobic oily liquid to be encapsulated and emulsified in an aqueous solution of a water-soluble polymer whereby at the stage of forming capsules by polymerizing melamine and formaldehyde, precondensates thereof or urea and formaldehyde, the stability of the emulsion is increased, and flocculation and flotation of the oily liquid are prevented.

2. Description of the Prior Art

Methods of forming capsules with a shell of a urea-formaldehyde resin are classified into a method in which encapsulation is effected after forming a precondensate of urea and formaldehyde which is soluble in water and an oily liquid, and a method in which capsules are formed simultaneously with the polycondensation of urea and formaldehyde. The former method is described in U.S. Pat. Nos. 3,016,308, 3,516,846 and 3,993,831, Japanese Patent Publication Nos. 12380/62, 12518/63, 30282/71, 29483/70, 14379/69, 18671/77, Japanese Patent Application (OPI) No. 7313/71 (the term "OPI" as used herein refers to a "published unexamined Japanese patent application"), etc. The latter method is described in U.S. Pat. Nos. 4,001,140 and 4,089,802. When compared with the method in which the precondensate is used, the method in which urea and formaldehyde are used and the capsules are formed simultaneously with the polycondensation of the urea and formaldehyde is preferred because the production steps are simpler and a highly concentrated solution can be prepared. This method, however, suffers from the disadvantages that microcapsules cannot be formed unless a water-soluble polymer having a sufficiently high emulsion stabilizing capability is employed and for this purpose only limited polymers are suitable. Furthermore, the temperature of the encapsulation reaction must be increased as compared with the method in which the precondensate is formed, and coalescence of the oily liquid and flotation of the oily particle on the surface as explained later take place.

The formation of microcapsules of an oily liquid together with the polymerization of urea and formaldehyde in the presence of a water-soluble polymer is disclosed in U.S. Pat. Nos. 4,001,140 and 4,089,802. This method comprises: (1) dissolving urea and resorcinol in an aqueous solution of a water-soluble polymer and the resulting solution is adjusted to near 3.5 in pH (vehicle preparation), (2) emulsifying a hydrophobic oily liquid to be encapsulated in the aqueous solution prepared at step (1), (3) adding formaldehyde to the emulsion prepared at step (2) (chemical addition), and (4) encapsulation—the resulting mixture is heated with stirring to cause the polycondensation of urea and formaldehyde whereby capsule walls are formed.

A method of forming capsules having a shell of a melamine-formaldehyde resin is disclosed in U.S. Patent No. 4,100,103 and Japanese Patent Application (OPI) No. 49984/79. This method relies upon a copolymer of maleic anhydride and an ethylene based monomer or an aqueous solution of polyacrylic acid as a water-soluble polymer and it involves (1) emulsifying a hydrophobic oily liquid, (2) mixing the resulting emulsion with an aqueous solution of melamine and formaldehyde or a precondensate of melamine and formaldehyde, and (3) adjusting the pH value of the resulting mixture and raising the temperature thereof to effect the encapsulation.

The water-soluble polymers used in the above methods have four roles. They function as an accelerator form emulsifying the oily liquid to be encapsulated, as a stabilizer of the emulsion, as an accelerator for forming a capsule wall, and as a dispersant of the capsule. Among these roles, their ability to stabilize the emulsion, in particular, is insufficient.

For example, when an isobutylene-maleic anhydride copolymer, polyacrylic acid or a vinyl acetate-maleic anhydride copolymer is used, the hydrophobic oily liquid is not completely emulsified in the emulsification step and a film of the hydrophobic oily liquid covers the surface of the emulsion. In the chemical addition step and encapsulation step, the oily liquid particles in the emulsion flocculate or combine, accelerating the formation of the film of the oily liquid and forming large particles. Since the film of the oily liquid remains unencapsulated, for example, in coating a capsule solution on paper for the production of a pressure-sensitive recording paper, the film repels the coating solution and a uniformly coated product is not obtained. Furthermore, large particles of the oily liquid are encapsulated as they are. Therefore, when such capsules are used in the production of a pressure-sensitive paper, they rupture upon application of the slightest force, leading to serious problems such as contamination of paper.

In addition, even when a water-soluble polymer having relatively good capability to stabilize the emulsion is employed, if the temperature of the system is raised or the pH value is reduced in order to accelerate encapsulation, the stability of the emulsion is reduced, leading to the flotation of the oil and the formation of the large particles.

Moreover, a reduction in the amount of the water-soluble polymer, which is effective to lower the viscosity and reduce costs, is limited because it deteriorates the stability of the emulsion.

Another disadvantage is that the viscosity of the capsule solution prepared is high. This is mainly due to the viscosity of the polymer being used. However, when the molecular weight of the polymer is decreased or the amount of the polymer added is decreased in order to reduce the viscosity of the capsule solution, the stability of the emulsion is further reduced, leading to formation of the film of the oily liquid and of large particles.

This phenomenon is accelerated by lengthening the storage period of the emulsion and by raising the encapsulation temperature.

As already disclosed in Japanese Patent Application No. 15675/78, the use of gum arabic in encapsulation creates excellent effects, for example, it reduces the viscosity of the system, improves washability, and accelerates encapsulation. However, it has the defect that large capsules are easily formed due to the unsuitable stability of the emulsion. The phenomenon is accelerated by lengthening the period of the chemical addition step or by raising the temperatuure at encapsulation step.

SUMMARY OF THE INVENTION

An object of this invention is to provide a process for producing a microcapsule solution which is free from the various problems described above resulting from the instability of an emulsion by increasing the stability of the emulsion.

Another object of this invention is to provide a process for forming capsules with a shell of a melamine resin by enveloping an oily liquid by polycondensation reaction of melamine and formaldehyde or a melamine-formaldehyde precondensate whereby the kind and amount of water-soluble polymer used is broadened and microcapsules can be obtained which are little affected by variations in reaction conditions such as the temperature of the reaction system, the pH value, the kind and amount of additives, etc.

Another object of this invention is to provide a process for forming capsules with a shell of a urea-formaldehyde resin by enveloping an oily liquid simultaneously with the polycondensation of urea and formaldehyde.

These objects and other objects are attained by incorporating a polyvalent isocyanate, a polyvalent isothiocyanate or a prepolymer thereof into an oily liquid to be microencapsulated and emulsifying the resulting oily liquid in an aqueous solution of a water-soluble polymer.

DETAILED DESCRIPTION OF THE INVENTION

According to this invention, it is now possible to use polymers having low emulsion stabilizing capabilities. In addition, it is possible to raise the reaction temperature in the encapsulation step in order to accelerate the reaction and to lower the pH of the reaction solution.

Polyvalent isocyanates, polyvalent isothiocyanates or prepolymers thereof which can be used in this invention are compounds containing two or more isocyanate or isothiocyanate groups. Representative examples of such compounds are diisocyanates and diisothiocyanates such as m-phenylenediisocyanate, p-phenylenediisocyanate, 2,6-tolylenediisocyanate, 2,4-tolylenediisocyanate, naphthalene-1,4-diisocyanate, diphenylmethane-4,4'-diisocyanate, 3,3'-dimethoxy-4,4'-biphenyldiisocyanate, 3,3'-dimethylphenylmethane-4,4'-diisocyanate, xylylene-1,4-diisocyanate, xylylene-1,3-diisocyanate, 4,4'-diphenylpropanediisocyanate, trimethylenediisocyanate, hexamethylenediisocyanate, propylene-1,2-diisocyanate, butylene-1,2-diisocyanate, ethylidinediisocyanate, cyclohexylene-1,2-diisocyanate, cyclohexylene-1,4-diisocyanate, p-phenylenediisothiocyanate, xylylene-1,4-diisothiocyanate, ethylidineisothiocyanate and the like; triisocyanates such as 4,4',4''-triphenylmethanetriisocyanate, toluene-2,4,6-triisocyanate, polymethylenepolyphenyltriisocyanate and the like; tetraisocyanates such as 4,4'-dimethyldiphenylmethane-2,2',5,5'-tetraisocyanate and the like; polyisocyanate prepolymers such as an adduct of hexamethylenediisocyanate and hexanetriol, an adduct of 2,4-tolylenediisocyanate and catechol, an adduct of tolylenediisocyanate and hexanetriol, an adduct of tolylenediisocyanate and trimethylolpropane, an adduct of xylylenediisocyanate and trimethylolpropane, an adduct of hexamethylenediisocyanate and trimethylolpropane, and the like; and any suitable polyisocyanates and polyisothiocyanates similar thereto. Among these compounds, prepolymers having 15 or less repeating units are particularly preferred. They can be used alone or in combination with each other.

The polyvalent isocyanate, the polyvalent isothiocyanate or the prepolymer thereof added to the hydrophobic oily liquid may be added to the hydrophobic oily liquid either directly or after being dissolved in an organic solvent.

The use of these additives is not limited except that they are added to the hydrophobic oily liquid prior to the emulsification. The polyvalent isocyanate, the polyvalent isothiocyanate or the prepolymer thereof are added in an amount of about 0.005 to 3 parts per 100 parts of the hydrophobic oily liquid and preferably about 0.01 to 2 parts. A more preferred range is about 0.02 to 1 part, with the most preferred range being between about 0.02 and 0.3 part. Because the polyvalent isocyanate is not added for the purpose of forming the capsule walls, it is not necessary to add it in an amount more than necessary for improving the stability of the emulsion. If the polyvalent isocyanate is added in an amount of more than necessary, the emulsification rate may be reduced and the solution may color.

It is preferred to use an anionic, cationic or nonionic surface active agent in emulsifying and dispersing the hydrophobic oily liquid encapsulated in the aqueous solution of the water-soluble polymer, because it accelerates the emulsification and prevents inversion, i.e., the formation of a water in oil type of emulsion. Typically, the surface active agent is used in an amount of about 0.03 to 5% by weight, preferably 0.1 to 3% by weight, based on the hydrophobic oily liquid.

The process of this invention comprises fundamentally the following steps:

(1) Preparing an aqueous solution of a water-soluble polymer. In the case of preparing microcapsules with a urea-formaldehyde capsule wall, the urea may be added to the aqueous solution at this stage.

(2) Emulsifying and dispersing the hydrophobic oily liquid to be encapsulated to which a polyvalent isocyanate, a polyvalent isothiocyanate or a prepolymer thereof has been added alone or in combination in the aqueous solution prepared in Step (1).

(3) Adding an aqueous solution of melamine and formaldehyde or a precondensate thereof to the emulsion prepared in Step (2) in the case of forming melamine-formaldehyde capsule walls, and adding formaldehyde and optionally urea to the emulsion of Step (2) when forming urea-formaldehyde capsule walls (in connection with the addition of urea, it may be added at Step (1) or after Step (2) and before step (4)).

(4) Forming the capsule walls by raising the temperature of the resulting mixture while controlling the pH value and stirring, whereby the melamine and formaldehyde or urea and formaldehyde are polycondensed.

In the polycondensation, the simultaneous use of an ammonium salt of an acid accelerates the polycondensation reaction. Particularly preferred ammonium salts include ammonium chloride, ammonium sulfate, ammonium nitrate, and diammonium hydrogenphosphate. Suitable acceleration is obtained using about 0.5 to 100% by weight, preferably 2 to 20% by weight salt based on the urea or melamine.

Oily liquids which can be encapsulated by the process of this invention include natural mineral oil, animal oil, vegetable oil and synthetic oil. Examples of such mineral oils are petroleum and its fractions such as kerosine, gasoline, naphtha and paraffin oil. Examples of animal oils are fish oil and lard. Examples of vegetable oils are groundnut oil, linseed oil, castor oil and corn oil. Examples of synthetic oils are a biphenyl compound (e.g., isopropylbiphenyl and isoamylbiphenyl), a terphenyl compound (e.g., compounds described in German Patent Application (OLS) No. 2,153,635), a phosphoric acid compound (e.g., triphenyl phosphate), a naphthalene compound (e.g., compounds described in German Patent Application (OLS) No. 2,141,194), a methane compound (e.g., compounds described in German Patent Application (OLS) No. 2,153,634), a phthalic acid compound (e.g., diethyl phthalate, dibutyl phthalate, dioctyl phthalate), and a salicylic acid compound (e.g., ethyl salicylate).

To these natural mineral, animal, vegetable and synthetic oils, agricultural chemicals, medicines, perfumes, chemicals, adhesives, liquid crystals, foods, detergents, dyes, dye precursors, developers, catalysts, rust preventing agents or the like can be added depending upon the purpose of using the capsule.

The amount of the water-soluble polymer used is usually about 0.5 to 30 wt% of the hydrophobic oily liquid to be encapsulated and is preferably about 1 to 20 wt%. The water-soluble polymer may be a water-soluble anionic polymer, a water-soluble nonionic polymer or a water-soluble amphoteric polymer. The solution of the water-soluble polymer prepared in Step (1) of the process outlined above generally will have a concentration of about 0.5 to 20 wt%, the hydrophobic oily liquid is in turn dispersed in the aqueous solution in an amount of about 1 to 60 wt% and the concentration for the aqueous solution of urea, melamine and/or formaldehyde is 0.2 to 40 wt%, preferably 1 to 20 wt%, based on the hydrophobic oily liquid.

Any natural or synthetic anionic polymer, e.g., polymers containing —COO$^-$, —SO$_3^-$ or like groups can be used. Examples of such natural anionic polymers are gum arabic and alginic acid. Examples of half-synthetic anionic polymers are carboxymethyl cellulose, phthalated gelatin, sulfated starch, cellulose sulfate, and lignin sulfonic acid. Synthetic anionic polymers which can be used in this invention include maleic anhydride based copolymers (including those copolymers hydrolyzed), acrylic acid based homopolymers and copolymers (including methacrylic acid based homopolymers and copolymers), vinyl-benzenesulfonic acid based homopolymers and copolymers, and carboxy modified polyvinyl alcohols.

Maleic anhydride based copolymers (including hydrolyzed copolymers) which can be used in this invention include a methyl vinyl ether-maleic anhydride copolymer, an ethylene-maleic anhydride copolymer, a vinyl acetate-maleic anhydride copolymer, a methacrylamide-maleic anhydride copolymer, an isobutylene-maleic anhydride copolymer, a styrene-maleic anhydride copolymer and the like, with those copolymers having molecular weights of about 5,000 to about 2,000,000 being preferred.

Acrylic acid based copolymers which can be used in this invention include a methyl acrylate-acrylic acid copolymer, an ethyl acrylate-acrylic acid copolymer, a methyl acrylate-methacrylic acid copolymer, a methyl methacrylate-acrylic acid copolymer, a methyl methacrylate-methacrylic acid copolymer, a methyl acrylate-acrylamide-acrylic acid copolymer, an acrylonitrile-acrylic acid copolymer, an acrylonitrile-methacrylic acid copolymer, a hydroxyethyl acrylate-acrylic acid copolymer, a hydroxyethyl methacrylate-methacrylic acid copolymer, a vinyl acetate-acrylic acid copolymer, a vinyl acetate-methacrylic acid copolymer, an acrylamide-acrylic acid copolymer, an acrylamide-methacrylic acid copolymer, a methacrylamide-acrylic acid copolymer, a methacrylamide-methacrylic acid copolymer and the like, the alkali metal salts thereof, etc.

The molecular weight of the acrylic acid based copolymer is preferably about 20,000 to about 1,000,000. The proportion of acrylic acid or methacrylic acid (or its salt) in the acrylic acid based copolymer is preferably about 5 to 100 mol%.

Vinylbenzenesulfonic acid based copolymers which can be used in this invention include a methyl acrylate-vinylbenzenesulfonic acid copolymer (or its salt), a vinyl acetate-vinylbenzenesulfonic acid copolymer, an acrylamide-vinylbenzenesulfonic acid copolymer, an acryloylmorpholine-vinylbenzenesulfonic acid copolymer, a vinylpyrrolidone-vinylbenzenesulfonic acid copolymer and the like.

The molecular weight of the vinylbenzenesulfonic acid based copolymer is preferably about 5,000 to about 2,000,000 and more preferably about 10,000 to about 1,000,000, with the most preferred range being between about 20,000 and about 500,000.

Suitable carboxy modified polyvinyl alcohol has a molecular weight of about 1,000 to about 300,000, a degree of saponification of 90% of more, and a content of a carboxy group of about 1 to 40 mol%. The carboxy modified polyvinyl alcohol can be produced by (1) a method in which a carboxy group-containing vinyl or vinylidene monomer (see, for example, Canadian Patent No. 929,430) is copolymerized with a vinyl ester such as an ester of vinyl alcohol and a $C_1$ to $C_5$ acid and hydrolyzed; (2) a method in which polyvinyl alcohol is reacted with a polybasic acid derivative, such as acid anhydride and acid halide, to introduce a unit containing a carboxyl group as a side chain; and so on. The carboxy modified polyvinyl alcohol to be used in this invention may be produced by any of the above-described methods.

As the nonionic polymers, natural and synthetic nonionic polymers, for example, those polymers containing —OH groups can be used. Examples of nonionic half-synthetic polymers are hydroxyethyl cellulose, pluran (amorphous and easily water-soluble high molecular weight oligomer produced by the microorganic fermentation of starch), soluble starch, oxidized starch and the like. As a synthetic nonionic polymer, there can be mentioned polyvinyl alcohol. Polyvinyl alcohol having a molecular weight of about 10,000 to about 200,000 and a degree of saponification of 90% or more is suitably used in this invention.

As water-soluble amphoteric polymers, mention can be made of gelatin, gelatin derivatives, etc.

To effect the polycondensation reaction of melamine and formaldehyde, it is necessary to control the pH of the total reaction system to 7.0 or less, preferably 6.5 or less. The lower limit of the pH value varies depending upon the nature of the water-soluble polymer used. So long as the polymer is soluble, as the pH approaches 4.0, the reaction rate is increased. In some cases, however, when the reaction rate is increased excessively, the reaction system flocculates or stirring of the reaction system becomes impossible. It is, therefore, preferred to choose a most suitable pH within the range of 6.5 to 4.0 taking into account the nature of the water-soluble polymer. The encapsulation temperature is adjusted to a range of 35° C. to 95° C., preferably 50° C. to 95° C.

The molar ratio of formaldehyde to melamine is usually about 1.5 to 5 and preferably about 2 to 4.

For effecting the polymerization reaction of urea and formaldehyde, the pH value of the whole system is controlled to be about 7.0 or less, preferably about 5.0 or less, and more preferably about 4.5 or less. In addition, the temperature of the whole system should be about 10° to 95° C., preferably about 35° to 95° C., and more preferably about 50° to 95° C.

The molar ratio of formaldehyde to urea is preferably about 0.6 to 5.0 and more preferably about 1.2 to 3.0.

A polyvalent phenolic compound may be added upon the reaction of urea and formaldehyde according to this invention. Polyvalent phenolic compounds which can be used in this invention include resorcin, catechol, pyrogallol, phloroglucinol, gallic acid, hydroquinone, orcinol, and tannic acid. When it is used, it is added in an amount of 5 to 50% by weight based upon the weight of urea.

The size of the microcapsule can be chosen appropriately according to the use thereof. When it is used in a pressure-sensitive paper, the weight average size of the capsule is preferably 1 to 20 microns, more preferably 1.5 to 10 microns, and most preferably 2 to 8 microns.

This invention is very effective for producing microcapsules and particularly for producing microcapsules for use in the production of a pressure-sensitive paper. The process of this invention enables the production of a pressure-sensitive recording paper which is free from contamination, local coloration, and furthermore from those undesired areas where no color is formed due to uneven coating.

The following examples and comparative examples are given to illustrate this invention in greater detail although this invention is not limited to them.

EXAMPLE 1

As a water-soluble polymer there was employed a partial sodium salt of polyvinylbenzenesulfonic acid (VERSA TL 500 produced by National Starch Co. Average molecular weight 500,000). 5 g of VERSA TL 500 was added with stirring to 95 g of hot water at about 80° C., dissolved and cooled. The pH value of the resulting aqueous solution was 2 to 3, and a 20% by weight aqueous solution of sodium hydroxide was added thereto to adjust the pH value to 4.0.

In 100 g of KMC-113 (produced by Kureha Chemical Co., Ltd., alkylnaphthalene containing diisopropylnaphthalene as a major component) was dissolved 4 g of Crystal Violet Lactone (CVL) by heating to provide a hydrophobic solution to be encapsulated. In this hydrophobic solution, 0.3 part of a polyvalent isocyanate (for example, MILLIONATE MR produced by Nippon Polyurethane Industry Co., Ltd., a mixture of methylenebisphenyl isocyanate (MDI) oligomers) was dissolved. The resulting solution was added to and emulsified in the above water-soluble polymer aqueous solution while stirring vigorously to provide an O/W type emulsion. The stirring was stopped when the oil droplet size reached about 4.5μ (volume average), and there was thus obtained an emulsion.

A mixture of 6 g of melamine, 11 g of a 37% by weight aqueous solution of formaldehyde, and 83 g of water was stirred while heating at 60° C., and after 30 minutes there was obtained a clear aqueous mixture of melamine, formaldehyde and melamine-formaldehyde precondensate. The pH value of this aqueous mixture was 6 to 8. Hereinafter this aqueous mixture consisting of melamine, formaldehyde and a melamine-formaldehyde precondensate is referred to as a precondensate solution.

This precondensate solution was added to and dissolved in the above prepared emulsion. The resulting mixture was controlled to a pH of 6.0 by adding a 20% by weight acetic acid solution and heated up to 65° C., and it was stirred. On continuing the stirring under the above conditions, in 30 minutes, there were formed capsules having good heat resistance.

The term "heat resistance" as used herein is used to mean the degree of difficulty with which the material contained in the microcapsule is released when the microcapsule is coated on paper, dried, and then allowed to stand in an oven at 100° C. for 10 hours. Those capsules having higher degrees of difficulty are considered better.

The thus obtained capsule solution was cooled to room temperature and adjusted to pH 9.0 with 20% by weight sodium hydroxide.

COMPARATIVE EXAMPLE 1

The procedure of Example 1 was repeated without adding polyvalent isocyanate to the hydrophobic solution.

To detect the film of the oily liquid remaining unencapsulated and the large particles of the oily liquid, the following procedure was used:

A capsule solution was diluted with water to three times the original volume, allowed to stand for 5 minutes, coated on a sheet with a developer (zinc salt of salicylic acid and active clay) coated thereon, and dried.

When the capsule solution obtained in Example 1 was used, there was obtained a white coated paper with no contamination, whereas with the capsule solution obtained in the Comparative Example, there was obtained a coated paper contaminated by coloration in the form of stripes or spots. The coloration in the form of stripes was indicative of the film of the oily liquid remaining unencapsulated, and the coloration in the form of spots indicated large particles resulting from the flocculation and cohesion of the oily liquid.

EXAMPLE 2

The procedure of Example 1 was repeated except that a partial sodium salt of an ethylene-maleic anhydride copolymer was used in place of the partial sodium salt of polyvinylbenzenesulfonic acid as a water-soluble polymer, and the amount of the polyvalent isocyanate (for example, mixture of toluenediisocyanate (TDI) oligomers; Takenate 4040 produced by Takeda Chemical Industries Co., Ltd.) was changed to 0.2 part.

With the thus-obtained capsule solution, the formation of large particles and float of the oily liquid was reduced as compared with the capsule solution in which no polyvalent isocyanate was added. This was a capsule solution desirable for the production of a pressure-sensitive recording paper.

EXAMPLE 3

Gum arabic powder was dissolved in water to give a 10% by weight aqueous solution thereof. In 100 parts of the aqueous solution, 10 parts of urea, 1 part of resorcinol and 55 parts of water were dissolved with stirring.

The resulting mixture was controlled to a pH of 4.0 with a 5 N aqueous solution of hydrochloric acid.

In 100 parts of diisopropylnaphthalene containing 2.5% of Crystal Violet Lactone and 1.0% of Benzoylleuco Methylene Blue was dissolved 0.2 part of a polyvalent isocyanate (for example, MILLIONATE MR produced by Nippon Polyurethane Industry Co., Ltd.). The solution so obtained was added with stirring to the above prepared solution and emulsified therein to provide an O/W type emulsion. The stirring was stopped when the oil droplet size reached about 4 microns (volume average).

The thus obtained emulsion was designated Emulsion (A).

To this solution was added 6 parts of a 10% by weight aqueous solution of ammonium chloride, and the temperature of the resulting mixture was controlled to 65° C. by adding 27 parts of a 37% aqueous solution of formaldehyde with stirring. Thereafter the temperature was kept at 65° C. for 2 hours while continuing the stirring. Then the temperature was lowered to 25° C. and the pH value of the system was adjusted to 9.0 by use of a 20% aqueous solution of sodium hydroxide. There was thus obtained a color former-containing oil capsule slurry.

With the thus-obtained color former-containing capsule slurry, the formation of large capsules and the flotation of the oil are markedly reduced as compared with a capsule slurry prepared without adding any polyvalent isocyanate, and it is useful in the production of a pressure-sensitive recording paper.

EXAMPLE 4

The procedure of Example 3 was repeated wherein a partial sodium salt of a vinyl acetate-maleic acid copolymer was used in place of gum arabic and 0.05 part of a polyvalent isocyanate (Takenate 4040 produced by Takeda Chemical Industries Co., Ltd., toluenediisocyanate oligomers) was used in place of 0.2 part of the polyvalent isocyanate. With the thus-obtained color former-containing capsule slurry, the formation of large particles and the flotation of oil are reduced as compared with a color former-containing oil capsule slurry prepared without adding any polyvalent isocyanate, and it is useful in the production of a pressure-sensitive recording paper.

EXAMPLE 5

The procedure of Example 4 was repeated wherein a sodium salt of an isobutylene-maleic acid copolymer was used in place of the sodium salt of the vinyl acetate-maleic acid copolymer and Desmodule VL (diphenylmethane diisocyanate produced by Bayern Co., in W. Germany) was used as a polyvalent isocyanate.

The thus-obtained color former-containing oil capsule slurry exhibited the same effects as that of Example 4.

EXAMPLE 6

The procedure of Example 3 was repeated except that a mixture of a sodium salt of an isobutylene-maleic acid copolymer and gum arabic was used in a weight ratio of 1:1 in place of gum arabic to obtain a color former-containing oil capsule slurry. The thus-obtained color former-containing oil capsule slurry exhibited the same effects as that of Example 3.

COMPARATIVE EXAMPLE 2

Emulsions were prepared by the same method as used in producing Emulsion (A) of Example 3 except that the amount of the polyvalent isocyanate was changed.

The polyvalent isocyanate was added in amounts of 0 part, 0.01 part, 0.03 part, 0.1 part, 0.3 part, 1.0 part, 3.0 parts and 10.0 parts per 100 parts of diisopropylnaphthalene containing 2.5% of Crystal Violet Lactone and 1.0% of Benzoylleuco Methylene Blue.

In order to measure the stabilities of these emulsions, they were heated to 65° C. without adding ammonium chloride and formaldehyde (that is, without effecting encapsulation) and kept at that temperature for 2 hours while continuing the stirring. Thereafter, after lowering the temperature to 25° C. and stopping the stirring, the amount of the oily liquid floating on the surface was observed (forced test). The results obtained are shown in the Table.

As a parameter to evaluate the emulsification rate when isocyanate was added, the volume average particle size of the droplets obtained after stirring for a predetermined time was measured. The results are shown in the Table.

The results illustrated in the Table indicate that even when gum arabic, an anionic polymer having a low emulsion stabilizing capability is employed, if the isocyanate is added to the system in an amount of 0.03 part or more per 100 parts of the oily liquid, the stability of the emulsion can be markedly improved.

In addition, it can be seen that the addition of a large amount of isocyanate tends to reduce the emulsification rate although it improves the stability of the emulsion. Therefore, the amount of the isocyanate used is preferably about 3 parts or less per 100 parts of the oily liquid.

The Table indicates the results when gum arabic is used as a water-soluble polymer. When an ethylene-maleic anhydride copolymer, an isobutylene-maleic anhydride copolymer, or a vinylbenzenesulfonic acid polymer, which have higher emulsion stabilizing capabilities than gum arabic, are employed, it is possible to produce an emulsion of good stability by using even less isocyanate.

TABLE

| | Evaluation | |
|---|---|---|
| Amount of Isocyanate per 100 Parts Oily Liquid (parts) | Volume Average Particle Size of Oil Droplet just after Emulsification ($\mu$) | Degree of* Flocculation of Oily Liquid (forced test) |
| 0.00 | 4.4 | A |
| 0.01 | 4.3 | A |
| 0.03 | 4.3 | B |
| 0.10 | 4.3 | C |
| 0.30 | 4.4 | C |
| 1.00 | 4.8 | C |
| 3.00 | 5.6 | C |
| 10.00 | 7.1 | C |

*A:Large particles resulting from the flocculation of oily liquid float on the surface and the emulsion cannot be practically used.
B:Some large particles are formed and the emulsion can be limitedly practically used.
C:There are no large particles and the emulsion can be practically used.

While the invention has been described in detail and with reference to specific embodiments thereof, it will be apparent to one skilled in the art that various changes and modifications can be made therein without departing from the spirit and scope thereof.

What is claimed is:

1. In a process for producing microcapsules which process comprises polymerizing urea and formaldehyde in the presence of a water-soluble polymer to form formaldehyde resin walls around a hydrophobic oily liquid, the improvement in which a polyvalent isocyanate, a polyvalent isothiocyanate or a prepolymer thereof is added to the hydrophobic oily liquid in an amount of about 0.02 to 1 part per 100 parts of hydrophobic oily liquid.

2. The process as claimed in claim 1, wherein the polyvalent isocyanate is diisocyanate, triisocyanate or tetraisocyanate.

3. The process as claimed in claim 1, wherein the polyvalent isothiocyanate is diisothiocyanate.

4. The process as claimed in claim 1, wherein the prepolymer is a polyisocyanate prepolymer.

5. The process as claimed in claim 4, wherein the polyisocyanate prepolymer is selected from the group consisting of an adduct of hexamethylenediisocyanate and hexanetriol, an adduct of 2,4-tolylenediisocyanate and catechol, an adduct of tolylenediisocyanate and hexanetriol, an adduct of tolylenediisocyanate and trimethylolpropane, an adduct of xylylenediisocyanate and trimethylolpropane, and an adduct of hexamethylenediisocyanate and trimethylolpropane.

6. The process of claim 1, wherein said water-soluble polymer is an anionic polymer.

7. The process of claim 6, wherein said anionic polymer is a maleic anhydride based copolymer, a (meth)acrylic acid based homopolymer or copolymer, a vinylbenzenesulfonic acid based homopolymer or copolymer, or a carboxy modified polyvinyl alcohol.

* * * * *